2,913,334
Patented Nov. 17, 1959

2,913,334

PROCESS FOR SEPARATING COBALT AND NICKEL FROM AMMONIACAL SOLUTIONS

John G. Dean, Wilton, Conn., assignor to the United States of America as represented by the Administrator, General Services Administration No Drawing. Application May 21, 1958
Serial No. 736,935

1 Claim. (Cl. 75—108)

This invention relates to the separation of nickel and cobalt from an ammoniacal solution in which they are dissolved and more particularly to a process in which the cobalt is selectively precipitated from the solution to provide eventually a nickel compound containing so little cobalt as to be commercially acceptable to a greater extent than heretofore.

A prior art process is known wherein nickel is extracted from nickeliferous ores containing some cobalt by reducing such ores in a furnace, next leaching the calcined ores in an ammoniacal solution to extract the nickel and the cobalt, and finally distilling the decanted product liquor to cause the nickel and cobalt to precipitate as nickel and cobalt compounds. In theory, such compounds will precipitate sequentially from the product liquor during distillation if most of the cobalt is in either the cobaltous or the cobaltic state and can be thereafter selectively filtered from the liquor. In actual practice, however, the two precipitates form practically simultaneously because of the presence in the product liquor of certain sulfur contaminants which tend so to affect the cobalt as to distribute it between the two states. It is therefore not commercially practical to separate the nickel and the cobalt by the known process so that after the intermixed nickel and cobalt compounds are calcined to form oxides of nickel and cobalt, the combined oxides, which are mainly nickel, are employed in industry wherever the amount of contained cobalt is not considered deleterious.

The foregoing inability to separate the cobalt from the nickel creates a number of disadvantages. Thus, if the amount of cobalt in the ore is so great that the finished oxides contain more than one part cobalt to one hundred parts nickel, the oxides have a considerably reduced market. To avoid this condition, it is customary to operate the process inefficiently in the leaching phase so as to limit the extraction of cobalt and thus produce a more commercially acceptable product. However, this remedy has the effect of simultaneously lowering the amount of nickel eventually recovered leading to wastage of the nickel which ends in the plant tailings heap.

The present invention contemplates the use of an additive to the ammoniacal product liquor which will definitely precipitate practically all of the cobalt from the liquor before the nickel whereby the latter is recoverable in the form of a relatively pure compound. Additives which successfully meet this objective and which permit selective precipitation of the cobalt from the product liquor with very little co-precipitation of nickel are found among the gaseous sulfides such as hydrogen sulfide ($H_2S$), and the water soluble sulfides such as sodium sulfide ($Na_2S$), ammonium sulfide ($[NH_4]_2S$) and sodium sulfhydrate (NaSH).

An added feature of the invention resides in the discovery that very rapid mixing of the additive with the product liquor to cause simultaneous precipitation throughout the total volume of the product liquor favors the more selective precipitation of the cobalt. Another feature is that limited aeration of the product liquor during precipitation by the additive enhances the selectivity of precipitation.

An object of the present invention is to provide a process whereby cobalt is precipitated selectively from an ammoniacal solution containing nickel and cobalt by treating such solution with a gaseous or water soluble sulfide before distillation thereof.

Another object of the invention is the provision of a process whereby cobalt is precipitated selectively from an ammoniacal solution containing nickel and cobalt by treating such solution in the presence of air or oxygen with a gaseous or water soluble sulfide before distillation thereof.

Still another object is to provide a process whereby cobalt is precipitated selectively from an ammoniacal solution containing nickel and cobalt by treating such solution with either hydrogen sulfide, sodium sulfide, ammonium sulfide or sodium sulfhydrate and aerating the solution.

Other objects and many of the attendant advantages of this invention will be readily appreciated as the same becomes better understood by reference to the following detailed description.

The novel process disclosed herein is intended to be employed in conjunction with a well known process for recovering nickel from nickeliferous ore containing cobalt and iron such as is found in Cuba in considerable quantities. The ore is dried to reduce substantially the moisture content, is ground to produce a finely divided mass, and is fed into the top of a vertical multiple hearth reduction furnace through which it passes downwardly at a slow rate. Undiluted producer gas is introduced at a low point in the furnace and combustion gases may be introduced at various higher levels which cause the ore to be preheated to a temperature of about 600° C. and then to be slowly heated in a reducing atmosphere to a final temperature between 700° C. and 850° C.

The calcined ore is cooled after it leaves the furnace and is eventually treated with an ammoniacal solution to leach out the nickel and cobalt. The ammoniacal solution is allowed to settle for a sufficient time to permit decantation of a product liquor containing a large percentage of the nickel in the ore and much of the cobalt. The product liquor is passed through a bubble tower counter-current to a flow of steam which distills the ammonia and other dissolved gases from the product liquor thereby causing the nickel and cobalt to precipitate generally in the form of carbonates. These carbonates may then be calcined to form oxides which are commercially useful. As previously pointed out, the nickel and cobalt co-precipitate and provide a final product which has more limited use than would a nickel product having a smaller cobalt content.

The present invention departs from the foregoing process by treating the product liquod after decantation and prior to distillation with a gaseous sulfide such as hydrogen sulfide or a water soluble sulfide such as sodium sulfide, ammonium sulfide and sodium sulfhydrate. These sulfides have the effect of causing the cobalt to precipitate immediately, and in advance of the nickel, as an insoluble sulfide which can be separated from the product liquor as by filtration. Very little of the nickel compounds will precipitate at this time. Thereafter the clarified liquor can be subjected to distillation to remove ammonia and carbon dioxide which results in precipitation of nickel basic carbonate and sulfates, these precipitates being amenable to further treatment to produce a commercial nickel product relatively free of cobalt.

In order to obtain the best results, the sulfide additive should be mixed rapidly throughout the product liquor as this causes precipitation to take place simultaneously throughout the liquor. Furthermore, countercurrent flow of the sulfide additive with respect to the product liquor reduces the quantity of sulfides required. Treating the product liquor to reduce most of the cobalt to the cobaltous form before applying the sulfide additive also results in smaller requirements for the additive.

Because gaseous hydrogen sulfide has a limited solubility in water, the time of application of this additive can be greatly reduced by applying it to the product liquor under pressures up to a few atmospheres.

The sulfide additives also bring about the selective removal of other impurities in the product liquor such as iron, copper, zinc and many other nonferrous metals which appear as contaminants therein and affect the salability of the final nickel products.

*Example 1*

In order to test the efficacy of each of the sulfide additives described above, several product liquors were analyzed to determine their nickel and cobalt contents. Varying amounts of each sulfide precipitant were then added to samples of the product liquors to cause precipitation of the cobalt. The precipitate was then filtered and analyzed to determine the percentage of the original amount of cobalt in the product liquor which was precipitated and also the percentage of the nickel originally in the product liquor which was co-precipitated with the cobalt. The parts of cobalt to one hundred parts of nickel in both the original product liquor and the filtrate were also computed to form a basis of comparison of the profound results produced by the sulfide additives. These result are tabulated in the following table:

| Liquor Composition | | | Precipitant | Filtrate | Precipitate | |
|---|---|---|---|---|---|---|
| g. Ni/100 ml. | g. Co/100 ml. | Pts. Co/100 Pts. Ni | g. Compound/ 100 ml., $(NH_4)_2S$ | Pts. Co/100 Pts. Ni | Percent Ni pptd. | Percent Co pptd. |
| 1.064 | .0185 | 1.74 | .034 | 1.54 | 0 | 11.4 |
|  |  |  | .068 | 1.05 | 0.1 | 39.5 |
|  |  |  | .14 | 0.18 | 4.4 | 90.3 |
|  |  |  | g. Compound/ 100 ml. $Na_2S$ |  |  |  |
| 1.085 | .0251 | 2.31 | .10 | 1.94 | 0 | 15.1 |
|  |  |  | .20 | 0.73 | 1.2 | 70.8 |
|  |  |  | g. Compound/ 100 ml. $H_2S$ |  |  |  |
| 1.085 | .0251 | 2.31 | .022 | 1.90 | 0.4 | 17.9 |
|  |  |  | .044 | 2.08 | 0.5 | 10.4 |
|  |  |  | .088 | 0.72 | 2.4 | 69.7 |

A study of this table indicates that in each instance the sulfide additive causes the selective precipitation of the cobalt in the product liquor with very little co-precipitation of the nickel so that the filtrate in each instance has fewer parts of cobalt to one hundred parts of nickel than did the product liquor which was treated. It can be seen that these additives have the ability to reduce the cobalt in the filtrate to below the desired commercial maximum of one part of cobalt to one hundred parts of nickel without the loss of an infeasible amount of nickel in the precipitate. It is also apparent from the results shown in the table that careful control of the amount of sulfide additive employed will produce a filtrate composed essentially of nickel having a commercially acceptable amount of cobalt therein and which is amenable to further treatment to produce compounds useful to industry.

*Example 2*

Having determined that certain of the soluble sulfides have the ability to selectively precipitate cobalt from ammoniacal solutions containing cobalt and nickel, it becomes desirable to find the cheapest sulfide which will perform this function so as to reduce the cost of the final products. Sodium sulfhydrate (NaSH), which is approximately 20–30 percent cheaper than sodium sulfide, was compared with the latter using product liquors containing 0.96, 1.68 and 3.1 parts cobalt per 100 parts of nickel and varying quantities of sulfide reagent to precipitate the cobalt. The results of these experiments are presented in the following table:

[Product liquor: 0.96 part cobalt/100 parts nickel.]

| Moles reagent added/mole Co | 4.83 | 7.30 | 9.85 | 14.7 | 19.6 |
|---|---|---|---|---|---|
| Percent Co precipitated by $Na_2S$ | 37 | 38 | 73 | 78 | 85 |
| Percent Co precipitated by NaSH | 43 | 58 | 71 | 81 | 84 |

[Product liquor: 1.68 parts cobalt/100 parts nickel.]

| Moles Reagent added/mole Co | 2.75 | 4.15 | 5.6 | 10.3 | 11.2 |
|---|---|---|---|---|---|
| Percent Co precipitated by $Na_2S$ | 32 | 50 | 66 | 87 | 90 |
| Percent Co precipitated by NaSH | 35 | 52 | 70 | 77 | 82 |

[Product liquor: 3.12 parts cobalt/100 parts nickel.]

| Moles reagent added/mole Co | 1.48 | 2.24 | 3.02 | 4.51 | 6.0 |
|---|---|---|---|---|---|
| Percent Co precipitated by $Na_2S$ | 18 | 20 | 43 | 67 | 76 |
| Percent Co precipitated by NaSH | 32 | 46 | 61 | 70 | 89 |

The table shows that sodium sulfhydrate is substantially equivalent to sodium sulfide as a selective precipitant for cobalt from ammoniacal solutions containing nickel and cobalt.

*Example 3*

It is desirable to enhance the effectiveness of the selective precipitation of cobalt from ammoniacal solutions containing cobalt and nickel by whatever methods possible which are both cheap and simple. Exhaustive study of the problem developed that very rapid mixing of the precipitant with the product liquor so that precipitation takes place simultaneously throughout the total volume of the liquor favors the more selective precipitation of the cobalt. It was also found that the nickel-cobalt ratio in the precipitate is affected by access to oxygen during the operation and that much more nickel is co-precipitated with the cobalt when the reaction mixture is fully protected from access to the air. A series of tests were run in which like amounts of a sulfide precipitant were mixed with samples of the same product liquor under various conditions of aeration as against a total absence of air. The results of such tests are shown in the following table:

PRECIPITATION OF COBALT FROM PRODUCT LIQUOR

| Amount Aeration | None ($CO_2$ Cover) | Surface Access To Air | 0.2 Cubic Foot $O_2$ | 0.4 Cubic Foot $O_2$ | 0.8 Cubic Foot $O_2$ |
|---|---|---|---|---|---|
| Ni/Co Ratio in Sulfide Precipitate | 14 | 6 | 6 | 5 | 3 |
| Cobalt Recovered (Percent) | 22 | 41 | 37 | 42 | 49 |
| Nickel Lost (Percent) | 3 | 2 | 2 | 2 | 1 |

These data show very clearly the beneficial effects of a small amount of oxygen on this reaction. The Ni/Co ratio in the sulfide precipitate is altered from 14 when no access to air is provided to 3 over the range of aeration illustrated. At the same time, the amount of cobalt recovered in the sulfide precipitate is doubled while the amount of nickel lost is reduced one-third.

It should be understood, of course, that the foregoing disclosure relates to only preferred embodiments of the invention and that numerous modifications and alterations may be made therein without departing from the spirit and scope of the invention as set forth in the appended claim.

What is claimed and desired to be protected by Letters Patent of the United States is:

In the recovery of nickel from an ammoniacal leach solution containing nickel, cobalt and the usual impurities, the process of obtaining the nickel content substantially free of cobalt which comprises mixing sodium sulfhydrate with the leach solution in the presence of oxygen to cause a substantial amount of the cobalt in the solution to precipitate selectively, and separating the precipitate from the remaining solution.

References Cited in the file of this patent

UNITED STATES PATENTS

| 2,694,006 | Schaufelberger et al. | Nov. 9, 1954 |
| 2,722,480 | Roy | Nov. 1, 1955 |
| 2,789,033 | Pruett | Apr. 16, 1957 |